J. G. PERRIN.
ADJUSTABLE LUBRICATING MECHANISM.
APPLICATION FILED SEPT. 5, 1911.
1,050,387.
Patented Jan. 14, 1913.
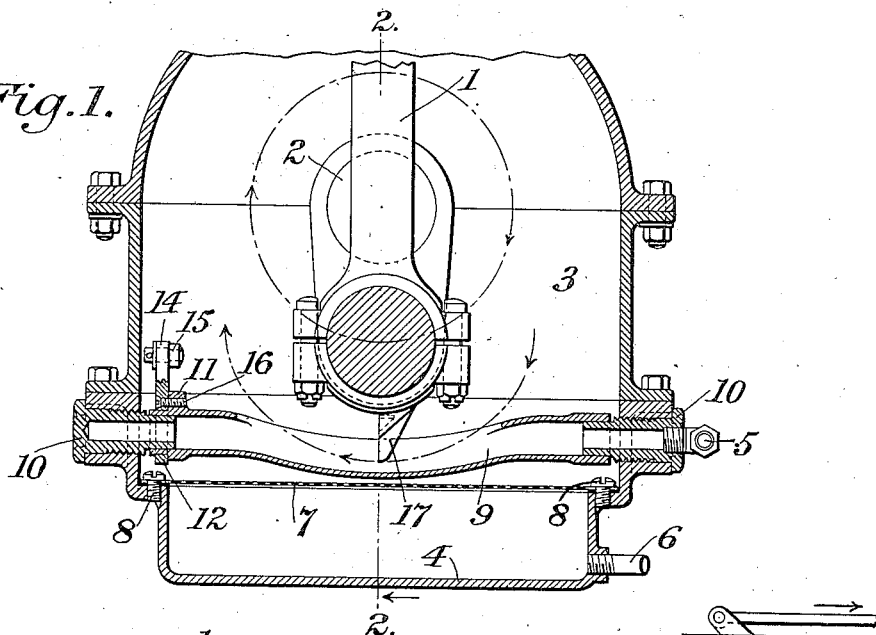
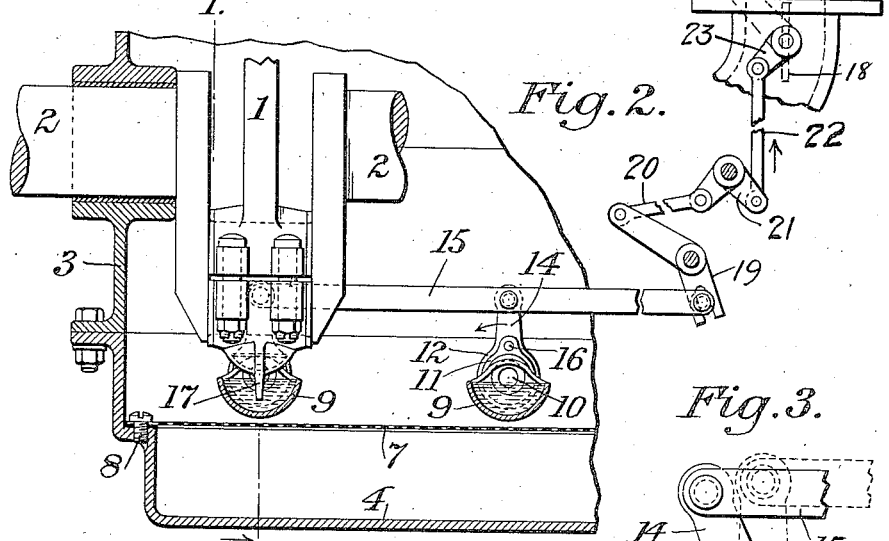
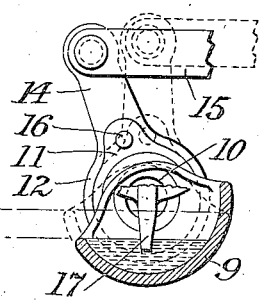
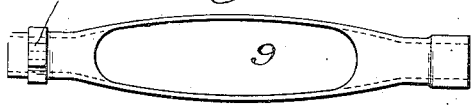
Witnesses:
Inventor:
John G. Perrin
By his Attorneys,

UNITED STATES PATENT OFFICE.

JOHN G. PERRIN, OF DETROIT, MICHIGAN.

ADJUSTABLE LUBRICATING MECHANISM.

1,050,387.   Specification of Letters Patent.   Patented Jan. 14, 1913.

Application filed September 5, 1911. Serial No. 647,647.

*To all whom it may concern:*

Be it known that I, JOHN G. PERRIN, a citizen of the United States, residing at Detroit, in the county of Wayne, State of Michigan, United States of America, have invented certain new and useful Improvements in Adjustable Lubricating Mechanism, of which the following is a specification.

This invention relates to adjustable lubricators for engines operated at varying speeds and relates particularly to improvements in splash lubricating system for hydro-carbon engines.

Heretofore much trouble has been experienced in properly lubricating the connecting rod crank shaft and piston bearings on hydro-carbon engines which are operated at greatly varying speeds because of difficulty in properly regulating the quantity of lubricant supplied to such bearings.

The primary object of my invention is to provide means whereby the amount of lubricant supplied to the bearing will be automatically adjusted by the speed of the engine itself.

The further object of the invention is to provide mechanism which shall be readily accessible for the purpose of cleaning and repairing.

The various other objects of the invention will be more fully set forth in the following description of one form of mechanism embodying the invention which consists in the new and novel feature of construction and combination of parts hereinafter set forth and claimed.

Referring to the accompanying drawings: Figure 1 is a section of the bonnet and crank case of a hydro-carbon engine provided with my improvements. Fig. 2 represents a vertical section on the line 2—2 of Fig. 1. Fig. 3 represents a detailed view, showing the different positions of the adjustable oil trough. Fig. 4 represents a detailed plan view of the oil trough.

In the drawings only one connecting rod 1 is shown but it is obvious that as many connecting rods will be employed as there are cylinders on the engine connected to the crank shaft 2. The shaft is inclosed in a crank case 3 which is preferably provided with a bonnet 4 in the usual manner. Oil is supplied to the crank case by pipe 5 and a pipe 6 is provided whereby the bonnet and crank case can be drained. Preferably a strainer 7 is secured to a shoulder formed integral with the bonnet by any suitable means as the screws 8.

Arranged beneath each connecting rod and tangentially to the line of travel of the connecting rod is an open ended oil trough 9 which is rotatably mounted at each end upon bearings formed upon a sleeve or bushing 10 secured to the bonnet and projecting a short distance within the casing. The pipe 5 communicates with the trough through one of said sleeves and provides means for supplying oil or other lubricant thereto. The trough is also provided with a web or flange 11 which provides means for the attachment of an actuating plate 12 having an arm 14 secured to or formed integral therewith which may be connected by any suitable means as the link 15 with the governor or throttle valve or any other moving part of the engine. The arm is secured rigidly to the trough by any suitable means as the screw 16. In the particular mechanism shown in the drawings the rotary movement of the troughs 9 are controlled by the throttle valve of the engne. In this particular construction the link 15 connected to the trough is operated by the throttle valve 18 through the fork lever 19, link 20, bell crank 21, link 22 and arm 23, which latter is secured to the spindle of the throttle valve so that the tilting of the trough will be proportional to the opening or closing of the throttle valve.

The connecting rod is provided with a splasher 17 which dips into the trough and forces out or splashes a quantity of lubricant contained in the trough, that normally falls upon and lubricates the crank shaft bearings.

In operation the oil trough, or in case a plurality of cylinders are used, all of the oil troughs are automatically rotated on the bearings provided by the sleeves by movement of the governor or the throttle valve or other moving part of the engine so that when the engine is running at a low speed the trough or troughs will be tilted and only a small quantity of the lubricant will remain therein. As the speed of the engine increases, however, the trough or troughs are automatically rotated on their bearings toward a horizontal or upright position so that a larger quantity of lubricant will be retained therein. Consequently, as the speed of the engine increases a gradually increasing quantity of lubricant will be automatically supplied to the bearings because of the greater quantity of lubricant and the increased rotation of the connecting rod.

My improved mechanism is extremely simple and compact in construction and can be operated with very little power. Considerable saving in lubricant can be effected since the quantity supplied to the bearings automatically decreases as the speed is reduced. When the speed is increased, however, the quantity of lubricant supplied is automatically increased to meet the increased demand therefor. Although I have shown only one form of mechanism embodying my invention, it is obvious that various changes within the skill of the mechanic may be made therein without departing from the spirit of the invention, provided the means set forth in the following claims are employed.

I claim as my invention:—

1. An adjustable lubricating mechanism for an engine comprising an oil trough adapted to hold a predetermined quantity of lubricant in its horizontal or upright position and means controlled by the engine speed for rotating said trough so as to vary the capacity thereof as the engine speed varies.

2. An adjustable lubricating mechanism comprising an open ended trough, bearings for said trough mounted in the ends thereof and means for rocking said trough on said bearings.

3. An adjustable lubricating mechanism for an engine comprising an oil trough having its side cut away, bearings mounted in the ends of said trough, means for supplying a lubricant through one of said bearings to the trough and means operatively connected with a moving part of the engine for rotating said trough on its bearings.

4. An adjustable lubricating mechanism, in combination with a connecting rod having a splash plate thereon and a casing therefor, of an oil trough mounted in such casing tangentially to the movement of the connecting rod, bearings for said trough mounted in the casing, means for supplying a lubricant to the trough through one of said bearings, an arm secured to said trough and means operatively connected with said arm for rocking the trough on its bearings.

5. An adjustable lubricating mechanism comprising a trough for the lubricant, a rotating splasher passing through said trough during a portion of its path, and means for regulating the capacity of said trough automatically to increase and decrease the amount of lubricant in the path of said splasher as the speed of rotation of said splasher increases and decreases.

6. An adjustable lubricating mechanism for an engine comprising an oil trough adapted to hold a predetermined quantity of lubricant in its horizontal or upright position, and means for rotating said trough so as to vary the capacity thereof as the engine speed varies.

7. An adjustable lubricating mechanism for an engine comprising an oil trough having its side cut away, bearings mounted in the ends of said trough, means for supplying a lubricant through one of said bearings to the trough and means for rotating said trough on its bearings.

8. An adjustable lubricating mechanism comprising a trough for the lubricant, a rotating splasher passing through said trough during a portion of its path, and means for regulating the capacity of said trough automatically to increase and decrease the amount of lubricant in the path of said splasher.

9. A lubricating mechanism comprising a receptacle for the lubricator, means for supplying the lubricant to the receptacle, means movable with the parts to be lubricated for changing the capacity of said receptacle directly with the speed of said parts, and means for lubricating said parts from the receptacle in proportion to the speed of said parts.

This specification signed and witnessed this 29 day of Aug A. D., 1911.

JOHN G. PERRIN.

Signed in the presence of—
OAKLEY E. DISTIN,
M. E. GROSVENOR.